UNITED STATES PATENT OFFICE.

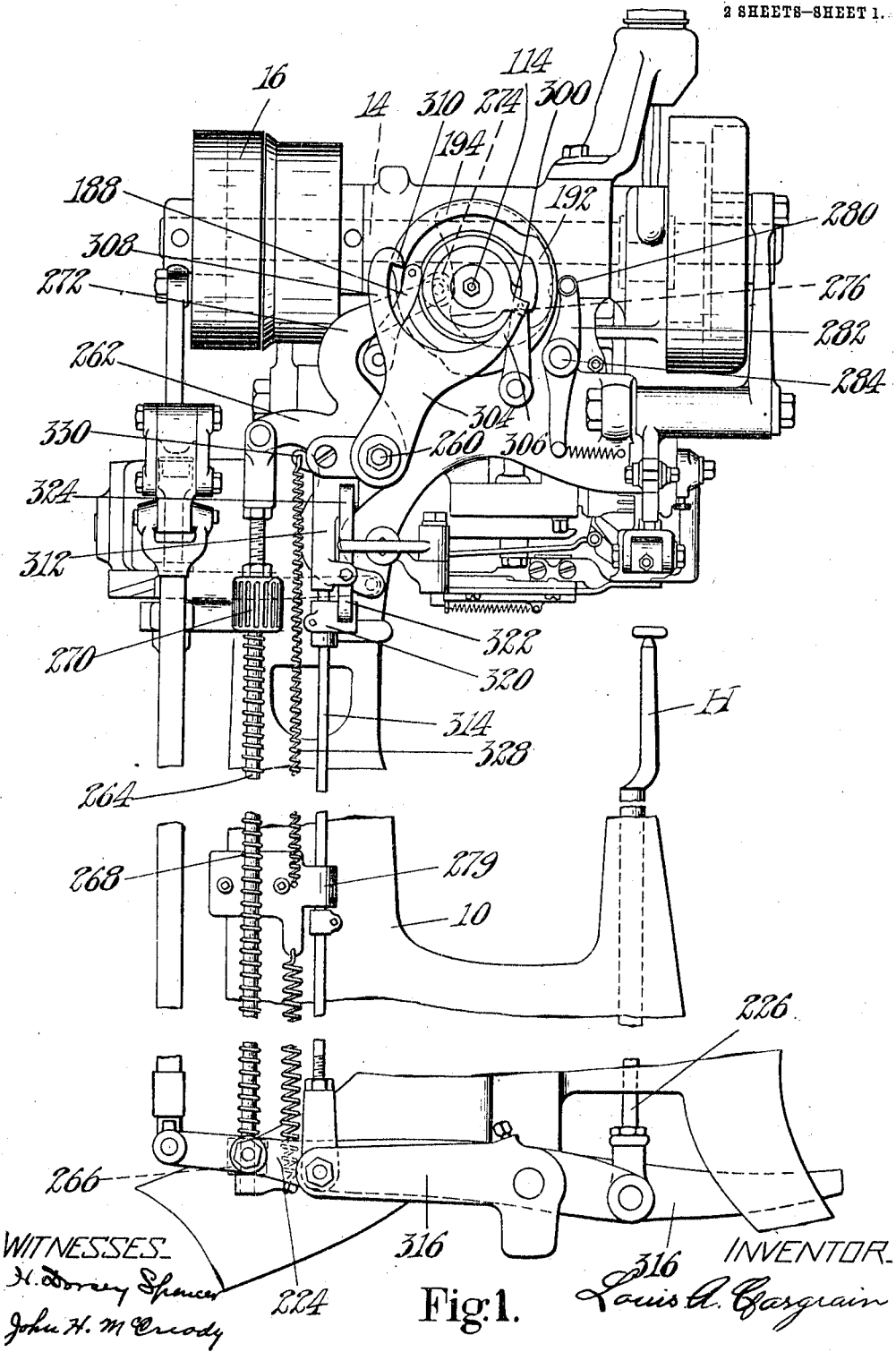

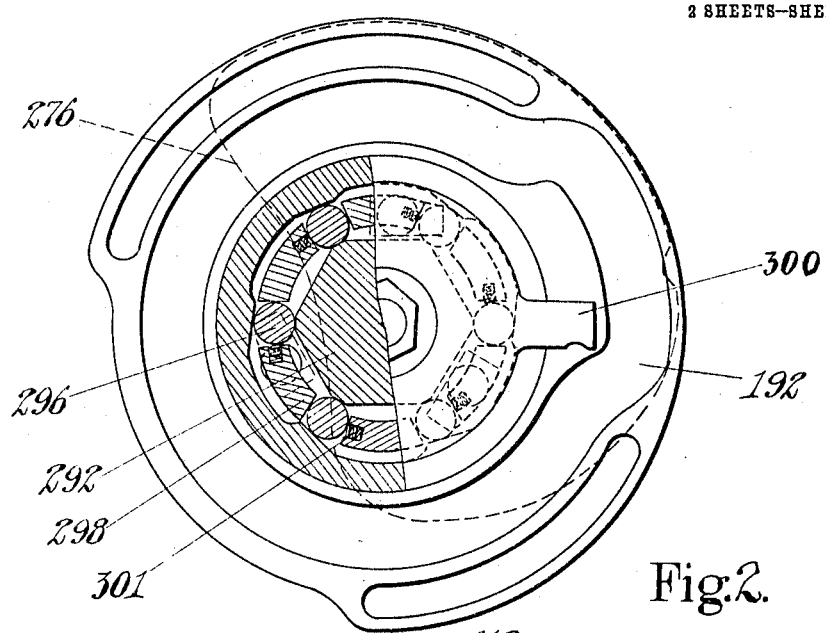
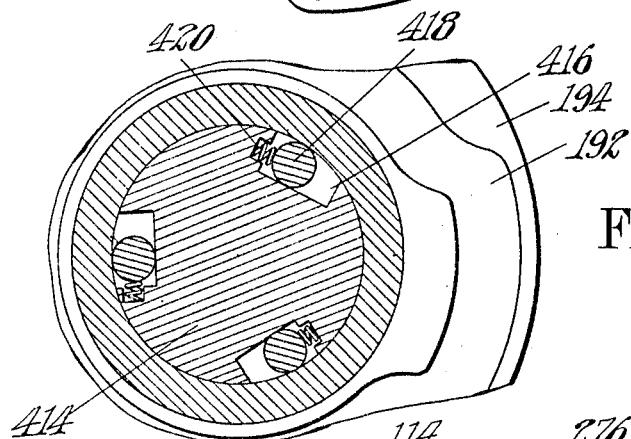
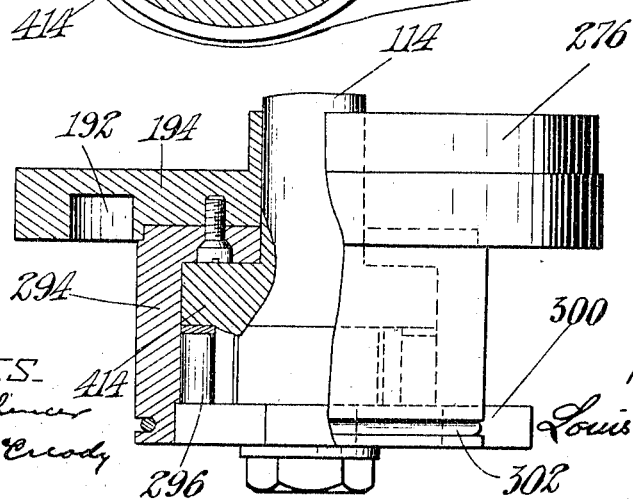

LOUIS A. CASGRAIN, OF BEVERLY, MASSACHUSETTS, ASSIGNOR TO UNITED SHOE MACHINERY COMPANY, OF PATERSON, NEW JERSEY, A CORPORATION OF NEW JERSEY.

CLUTCH.

1,004,240.  Specification of Letters Patent.  Patented Sept. 26, 1911.

Original application filed September 12, 1908, Serial No. 452,755. Divided and this application filed March 22, 1909. Serial No. 484,925.

*To all whom it may concern:*

Be it known that I, LOUIS A. CASGRAIN, a citizen of the United States, residing at Beverly, in the county of Essex and Commonwealth of Massachusetts, have invented certain Improvements in Clutches, of which the following description, in connection with the accompanying drawings, is a specification, like reference characters on the drawings indicating like parts in the several figures.

This invention relates to clutches and particularly to clutches of the type frequently referred to as the "Horton" clutch. A clutch of this type is disclosed in the United States patent to Horton, No. 260,394, July 4, 1882, and to this patent reference may be had for an understanding of the general principles of operation of this type of clutches.

It will be noted upon an inspection of the patent above referred to that the roller clutch therein disclosed is constructed and arranged to effect a clutching of the driving member and driven member at any angle of rotation of the driving member. In most machines in which clutches are employed this clutching operation is desirable. It will be observed, however, that a clutch of this kind could not be employed to connect a driving member and a driven member which must be connected at a particular angle of rotation of the driving member, and so far as I am aware clutches which employ the principle of operation of the clutch disclosed in the patent above referred to have not been employed for the purpose of connecting parts where the driven member must be connected to the driving member at a particular angle of rotation of the latter.

An object of the present invention, therefore, is so to improve the construction and operation of clutches which work upon the Horton clutch principle that such clutches may be used to effect a connection between a driving member and a driven member at a particular angle of rotation of the former, whereby the many advantages which attend the use of clutches of this type may be obtained in machines where such connection of the driving member and the driven member is essential or desirable.

Another object of the invention is to provide a clutch of the Horton clutch type which may be employed to connect a driven member to a driving member, which is itself driven from a second or main driving member, in such manner that the driven member may be clutched to its driving member at a particular angle of rotation of the second or main driving member.

A further object of the invention is to provide a clutch which will effect the just described connection when the driving member to which the driven member is to be clutched is connected to the second or main driving member in such manner that it is driven at a substantially reduced speed.

Other objects of the invention are the provision of means associated with the clutch for preventing a movement of the driven member with respect to the driving member in the direction of movement of the latter and the provision of novel clutch tripping means whereby a single movement of said means in either direction may serve to effect a clutching of the driven member to the driving member for a predetermined amount of movement and an automatic unclutching of said members at the end of said movement.

Still other objects will be apparent from a consideration of the following description and claims in connection with the accompanying drawings, in which,—

Figure 1 is a broken side elevation of a machine for inserting fastenings having associated with it the clutch of the present invention; Fig. 2 is a detail elevation, partly in section, of the clutch and the associated cams through which actuation of various parts of the machine for inserting fastenings is effected; Fig. 3 is a plan view, partly in section, of the parts shown in Fig. 2, and Fig. 4 is a detail section of the clutch employed to prevent relative movement of the driven member to the driving member in the direction of rotation of the latter.

The machine for inserting fastenings shown in Fig. 1 and with which the present clutch is associated and of which it constitutes an element is described and illustrated more fully in the co-pending application of Louis A. Casgrain, Serial No. 452,755, filed September 12, 1908, for Letters Patent on improvements in machines for inserting fastenings, of which application the present application is a division. In the machine of said co-pending application the main shaft 14 to which various elements of the inserting mechanism are constantly connected is constantly rotated by suitable connections from a source of power to a driving pulley 16, fixed thereon. Mounted in the machine head and lying transverse to the main shaft 14 is a second shaft 114 geared to the main shaft 14 to rotate at a reduced speed, said shaft 114 being arranged in the machine of said co-pending application to rotate once for each six rotations of the shaft 14. Both the shaft 14 and the shaft 114 are normally rotated, the connection between the shaft 114 and the shaft 14 being constant. Besides those parts of the inserting mechanism which are normally connected to the shaft 14 and are, therefore, constantly in operation are other parts which are brought into and out of operative relation to those constantly operated by means associated with the shaft 114 whereby the insertion of fastenings may be interrupted or started by effecting the clutching or unclutching of said means from the shaft 114. For this purpose the improved clutch constituting the subject-matter of the present invention is utilized.

The means through which the mechanisms not constantly connected to the main shaft 14 are brought into operative relation to those which are constantly connected to said shaft comprises, among other elements, a cam disk 194 attached to the driven member of the clutch now to be described, said cam disk having formed in and upon it various cams through which movement is imparted to other elements of the actuating means associated therewith. In the illustrated construction the cam disk 194 has formed in it a cam groove 192 in which travels a cam roller upon an arm 188, a horn raising cam 276 against which bears a cam roll 274 carried upon an arm 272 of a three-armed lever fulcrumed at 260 on the machine head and an edge cam with which coöperates a cam roll 280 upon an arm 282 attached to a rock-shaft 284 in the machine head. A second arm 262 of the three-armed lever above referred to is connected to a rod 264 which passes through a block 266 pivoted upon the horn raising lever 224 in the base of the machine. Between the block 266 and a nut 270 upon the threaded upper part of the rod 264 is confined a spring 268 by which yielding clamping pressure is brought to bear upon the work through the horn H connected by rod 226 to the front end of the lever 224. For a more detailed description of the elements just referred to reference may be had to the co-pending application above identified.

Inasmuch as the shaft 114, to which the cam disk 194 is to be clutched to effect an actuation of the various mechanisms which coöperate in the fastening inserting operation of the machine, rotates once for every six rotations of the main shaft 14, it is important not only that the cam disk be clutched to the shaft 114 at a particular angle of its rotation, but that a plurality of such selected clutching points be provided in order that a clutching may be effected, if desired, at any rotation of the main shaft 14, since the machine is preferably so constructed that after the parts have been brought into operative relation to each other a fastening will be inserted for every rotation of the main shaft 14. Since, as stated above, the main shaft rotates six times for every rotation of the shaft 114 it is preferable that six clutching points be provided, and in the illustrated construction six points are provided. Upon the shaft 114 is carried a hexagonal clutch member 292 between which and a clutch casing 294 attached to the cam disk 194 are arranged clutch rollers 296. A portion of the interior of the clutch casing 294 is concentric with the shaft 114. Other portions of this interior are, however, eccentric to the shaft 114 and of these portions there are six located at points 60° apart around the shaft 114. These eccentric portions upon the inner side of the casing 294 are so arranged with respect to the cams upon the cam disk 194 and with respect to the hexagonal member 292 upon the shaft 114 that when one of the rollers 296 is locked between one of the eccentric surfaces and one of the angular portions of the hexagonal member all of the rollers will be similarly locked and the cams upon the cam disk 194 will bear such relation to the main shaft 14 that the parts controlled by said cams will be brought into operative relation to the parts normally driven by the main shaft at the proper times.

The clutching of the cam disk 194 to the shaft 114 is effected through the following mechanism: Loosely mounted upon the end of the shaft 114 is a roller cage 298 between the inwardly projecting portions of which the rollers 296 are confined, and this cage is provided with an arm 300 by which it may be turned to effect a movement of the rollers relatively to the clutch casing 294. The inwardly projecting portions of the roller cage 298 may be provided with springs 301 whereby the rollers may be maintained yieldingly in contact with the opposed faces of the succeeding portions, such springs being likewise shown in the patent to Horton above referred to and constituting no part of the present invention. Surrounding the clutch casing and confined in a groove near the outer edge of it is a spring 302, one end of which bears against the upper side of an arm 300 and tends to turn the roller cage in the direction to effect the clutching of the cam disk 194 to the shaft 114. The cam disk 194 is however not clutched to the shaft 114 except when it is desired either to start the insertion of fastenings or, after the insertion of fastenings has been started, to stop it. Means is therefore provided for holding the roller cage 298 out of the position in which it effects a clutching of the cam disk 194 to the shaft 114. Preferably the means for holding the roller cage out of the position in which it effects a clutching of the cam disk 194 to the shaft 114 comprises means for maintaining the cage in clutching relation to the said disk and shaft, also, when the machine has been rendered operative to insert fastenings, and it is desired to insert several fastenings in succession. The illustrated means comprises a lever 304 pivoted at 260 upon the machine head and forked at its outer end to embrace the roller cage 298. The fork member 306 of the lever 304 is arranged to engage the arm 300 of the roller cage 298 when the machine is not operative to insert fastenings and to hold the cage out of the position in which it effects a clutching of the cam disk 194 to the shaft 114. The rotation of the cam disk 194 through an angle of approximately 180° is sufficient to place all the mechanisms controlled by it in operative relation to those mechanisms which are constantly operated from the main shaft, and the rotation of the cam disk 194 through a second angle of 180° serves to restore the mechanisms controlled by it to their inoperative relations to the mechanisms operated from the main shaft. If, therefore, it is desired to insert several fastenings in succession it is desirable that provision be made for interrupting the rotation of the cam disk 194 after it has traversed an angle of substantially 180° and for this purpose the other fork member 308 of the lever 304 is provided with a hook 310 which can be moved by the operator into the path of the arm 300 of the roller cage 298 as said cage turns with the clutch casing 294 after the cam disk 194 has been clutched to the shaft 114.

Means is provided by which the operator can turn the lever 304 to move the fork member 306 out from beneath the arm 300 of the roller casing 298 to permit the spring 302 to turn the casing in the direction to effect a clutching of the cam disk 194 to the shaft 114 and at the same time move the other fork member 308 into position to bring its hooked end 310 into the path of the arm 300 as the clutched parts begin to rotate with the roller casing. In the machine illustrated in the co-pending application the construction of this means is somewhat complicated, owing to the fact that it has functions which have no bearing upon the present invention, and for convenience therefore only those parts will be described herein which are essential to effect an operation of the mechanism with which the present invention is more directly concerned. To the other arm of the lever 304 is connected a member 312 having a socket in which is received the upper end of a rod 314 connected at its lower end to the rear end of a treadle 316, said treadle being normally maintained in its uppermost position by a spring not herein illustrated. A collar 320 clamped upon the rod 314, is connected by a toggle 322, 324 to the member 312. Provision is made for preventing breaking of the toggle in one direction. A spring 328 connected at one end to a hook 330 upon the lower arm of the lever 304 and at its other end to a bracket 279 upon the standard 10 tends to move the socket in the member 312 down over the rod 314, thus causing the lever 304 to turn about its pivot 260, this relative movement of the member 312 and the rod 314 being prevented by the toggle 322, 324 when it is in its normally straight position.

In the machine disclosed in the co-pending application of which this application is a division the cams upon the cam disk 194 are so arranged with respect to each other and so shaped that the first three rotations of the main shaft 14 after the cam disk is clutched to the shaft 114 are utilized to place the parts controlled by said cams in operative relation to each other and to the parts driven from the shaft 14, and the first fastening is partially inserted during the last half of the fourth rotation. If after depressing the treadle to effect a turning of the lever 304 toward the right in Fig. 1, and thereby a movement of the fork member 306 out of clutch releasing position, the operator takes his foot off from the treadle before approximately the end of the third rotation of the main shaft, which takes place after the clutched parts have begun to rotate together, or after the cam disk 194 has turned through an angle of substantially 180°, the lever 304 will be turned toward the left in Fig. 1, the hook member 310 will be moved out of the path of the arm 300, the fork member 306 will be moved again into said path, and the clutch will not be released until the clutched parts have made a complete rotation together.

In the case just described, the various mechanisms will be brought into operative relation to each other to effect the insertion of a single fastening and will again be thrown out of operative relation to each other before a second fastening can be inserted. If, however, the operator keeps his foot upon the treadle the hook 310 upon the fork member 308 will be maintained in the path of the arm 300 and the cam disk 194 will be unclutched from the shaft 114 near the end of the third rotation of the main shaft following the clutching of said members together, and it will be brought to rest in that position in which it maintains the various mechanisms not normally connected to the main shaft 14 in operative relation to the mechanisms normally connected to said shaft.

The cam 276 by which the horn is raised has somewhat abrupt changes of direction in its outline especially where it permits the horn to drop into work receiving position and therefore when the cam disk has made nearly a complete rotation and has been unclutched from the shaft 114 by the engagement of the fork member 306 of the lever 304 with the arm 300 on the clutch cage 298, the spring 268 which is pressing the roller 274 upon the arm 272 of the three-armed lever with considerable force against the cam 276 will tend to make the cam disk 194 turn about the shaft 114 in the direction of rotation of the latter faster than said shaft rotates. To prevent premature lowering of the horn therefore and to prevent at all times such undesirable relative movement of the cam disk 194 to the shaft 114 in the direction of rotation of the latter, a second clutch has been provided. This clutch is located in the clutch casing 294 and comprises a disk 414 upon the shaft 114, said disk having in its periphery inclined roller receiving recesses 416 in which are rollers 418 pressed by springs 420 toward the more shallow parts of said recesses, whereby they tend to become locked between the concentric inner surface of the casing 294 which surrounds the disk 194 and the bottoms of said recesses. It will be noted that these recesses are so arranged that the locking of the clutch casing 294 to the disk 414 takes place only in the direction of rotation of said disk and that therefore the disk is free to rotate relatively to the cam disk 194 when the disk is not clutched to the shaft 114 through the other clutch hereinabove described.

Having described my invention what I claim as new and desire to secure by Letters Patent of the United States is:—

1. In a machine of the class described, a clutch comprising two concentrically mounted relatively rotatable clutch members, each having eccentric roller engaging surfaces spaced apart equal numbers of degrees about the common center, similarly spaced rollers, and means for moving said rollers into and out of such positions that they will be locked between the eccentric surfaces of the two clutch members when said surfaces are in opposed relation, whereby said clutch members may be clutched together at will when in predetermined angular relations to each other.

2. In a machine of the class described, a clutch comprising two concentrically mounted relatively rotatable clutch members, each having eccentric roller engaging surfaces spaced apart equal numbers of degrees about the common center, similarly spaced rollers, means for moving said rollers into and out of such positions that they will be locked between the eccentric surfaces of the two clutch members when said surfaces are in opposed relation, and means for preventing movement of the driven clutch member faster than that imparted to it by the driving clutch member.

3. In a machine of the class described, a clutch comprising two concentrically mounted relatively rotatable clutch members, each having eccentric roller engaging surfaces spaced apart equal numbers of degrees about the common center, similarly spaced rollers adapted to be locked between the eccentric surfaces of the two clutch members when said surfaces are in opposed relation, and means for holding said rollers out of operative relation to the eccentric surfaces and for moving them again into operative relation thereto constructed and arranged to hold said rollers in predetermined relation to the eccentric surfaces of the driven clutch member when it is disconnected from the driving clutch member, whereby said clutch members may be again connected at a predetermined angle of rotation of the driven clutch member.

4. In a machine of the class described in which a secondary driving member is arranged to be driven from a main driving member at a different speed, a clutch comprising concentrically mounted relatively rotatable clutch members, one of which is connected to said secondary driving member, each of said clutch members having a number of roller engaging eccentricities corresponding to the speed ratio between the main driving member and the secondary driving member, said eccentricities being spaced apart equal numbers of degrees about the common center, similarly spaced rollers adapted to be locked between the eccentric surfaces of the two clutch members when said surfaces are in opposed relation, and means for holding said rollers out of operative relation to the eccentric surfaces and for moving them again into operative relation thereto, constructed and arranged to disconnect said clutch members at a predetermined angle of rotation of said main driving member and to hold said rollers in fixed relation to the eccentric surfaces of the driven clutch member while it is disconnected from the driving clutch member, whereby said clutch members may be again connected at the same angle of rotation of said main driving member.

5. In a machine of the class described, a driving member, a driven member, a clutch through which said driven member may be clutched to said driving member, means tending normally to effect the clutching of said members and a single clutch tripping device constructed and arranged to be brought by a single movement in a single direction into a position in which it effects both the actuation of said clutch to connect said members for a predetermined amount of movement and the unclutching of said members at the end of said movement.

6. A machine of the class described, having in combination, a driving member and a driven member, a clutch by which said driving member may be connected to said driven member comprising concentric clutch members, interposed rollers and a roller cage spring-pressed normally in the clutch actuating direction, and clutch controlling means constructed and arranged to be moved by a single movement in a single direction into such position that it permits the actuation of the clutch and a predetermined amount of movement of the clutched parts and then automatically, without further movement of any part effects an unclutching of said parts.

7. A machine of the class described, having in combination, a driving member and a driven member, a clutch for effecting an operative connection between said members comprising concentrically arranged clutch members one of which is carried by said driving member and the other of which is carried by said driven member, rollers intermediate said clutch members, means tending normally to effect a relative movement of said clutch members into clutching engagement with said rollers and clutch tripping means constructed to embrace said clutch and having clutch tripping arms upon opposite sides of the common center of said clutch members so spaced that one is brought into clutch tripping position as the other is moved out of clutch tripping position.

In testimony whereof I have signed my name to this specification in the presence of two subscribing witnesses.

LOUIS A. CASGRAIN.

Witnesses:
H. DORSEY SPENCER,
JOHN H. McCREADY.